US012017337B2

(12) United States Patent
Diehl et al.

(10) Patent No.: US 12,017,337 B2
(45) Date of Patent: Jun. 25, 2024

(54) HANDHELD, BATTERY-OPERATED WORK APPARATUS

(71) Applicant: Andreas Stihl AG & Co. KG, Waiblingen (DE)

(72) Inventors: Heiko Diehl, Esslingen (DE); Daniel Boepple, Stuttgart (DE); Alexander Haertel, Ludwigsburg (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 18/062,379

(22) Filed: Dec. 6, 2022

(65) Prior Publication Data

US 2024/0009826 A1    Jan. 11, 2024

(30) Foreign Application Priority Data

Jul. 7, 2022   (DE) ..................... 10 2022 116 975.8

(51) Int. Cl.
  *B25F 5/00*   (2006.01)
  *B25F 5/02*   (2006.01)

(52) U.S. Cl.
  CPC ..................... *B25F 5/02* (2013.01)

(58) Field of Classification Search
  CPC ........................................................ B25F 5/02
  See application file for complete search history.

(56) References Cited

U.S. PATENT DOCUMENTS 10,105,832 B2 *  10/2018  Martinsson ............. B27B 17/00
10,213,936 B2 *   2/2019  Bergquist .................. B25F 5/02
(Continued)

FOREIGN PATENT DOCUMENTS

CN   101927480 A   12/2010
CN   103299835 A    9/2013
(Continued)

OTHER PUBLICATIONS

DIN EN 61960, "Akkumulatoren und Batterien mit alkalischen oder anderen nichtsaeurehaltigen Elektrolyten—Lithium—Akkumulatoren und—batterien fuer tragbare Geraete", ("Secondary cells and batteries containing alkaline or other non-acid electrolytes—Secondary lithium cells and batteries for portable applications"), IEC 61960:2011), Deutsche Fassung EN 61960:2011, DIN Deutsches Institut fuer Normung e.V., Aug. 2011, pp. 1, 2 and 1 to 17.

*Primary Examiner* — Eyamindae C Jallow
(74) *Attorney, Agent, or Firm* — Walter Ottesen, P.A.

(57) ABSTRACT

A handheld apparatus includes a handle at least partially engaging around a housing. The housing extends along a longitudinal axis from the back to the front end. The apparatus possesses a longitudinal plane which in a storage position runs perpendicular to the horizontal plane and contains the longitudinal axis. An operator-control region has a handle opening penetrating fully through the housing in the direction transverse to the longitudinal plane. The handle opening has in the direction of the longitudinal axis a distance point with the largest distance to the back end. The operator-control region extends in the direction of the longitudinal axis from the back end up to the distance point. The housing possesses an imaginary tangential plane which is only tangent to the housing, runs perpendicular to the longitudinal plane and is tangent to the handle. The imaginary plane is tangent to the housing in the operator-control region.

26 Claims, 4 Drawing Sheets

(56) References Cited

U.S. PATENT DOCUMENTS

| | | | |
|---|---|---|---|
| 10,406,713 B2* | 9/2019 | Haneda | B27B 17/0008 |
| 11,058,982 B2* | 7/2021 | Miura | B01D 46/0005 |
| 11,543,898 B2* | 1/2023 | Gwosdz | H05K 5/0017 |
| 2010/0218386 A1 | 9/2010 | Rosskamp et al. | |
| 2010/0218967 A1 | 9/2010 | Rosskamp et al. | |
| 2011/0094762 A1 | 4/2011 | Liebhard | |
| 2012/0067608 A1 | 3/2012 | Heinzelmann et al. | |
| 2015/0165640 A1 | 6/2015 | Rosskamp et al. | |
| 2017/0259452 A1* | 9/2017 | Kachi | B25F 5/008 |
| 2018/0133818 A1 | 5/2018 | Mang et al. | |
| 2019/0255727 A1* | 8/2019 | Wolf | F02B 63/02 |
| 2020/0223090 A1* | 7/2020 | Osawa | B27B 17/0008 |
| 2020/0266690 A1* | 8/2020 | Agne | H02K 11/28 |
| 2022/0297211 A1 | 9/2022 | Mang et al. | |

FOREIGN PATENT DOCUMENTS

| | | |
|---|---|---|
| DE | 10 2009 012 178 A1 | 9/2010 |
| DE | 10 2010 045 993 A1 | 3/2012 |
| DE | 20 2013 100 852 U1 | 6/2013 |
| DE | 10 2016 013 910 A1 | 5/2018 |
| EP | 2 223 780 A2 | 9/2010 |
| WO | WO-2020111996 A1 * 6/2020 ........... B23D 59/025 |

* cited by examiner

HANDHELD, BATTERY-OPERATED WORK APPARATUS

CROSS-REFERENCE TO RELATED APPLICATIONS

This application claims the priority from German patent application No. 10 2022 116 975.8, filed on 7 Jul. 2022, which is incorporated here in its full scope by reference.

TECHNICAL FIELD

The disclosure relates to a handheld, battery-operated work apparatus.

BACKGROUND

Such work apparatuses generally possess a battery shaft for receiving a battery pack. In order to satisfy drop test requirements, the battery shaft should be configured to be very robust. The corresponding housing must have a pronounced ribbing and requires corresponding installation space.

SUMMARY

It is an object of the disclosure to further develop a work apparatus such that a compact configuration of the work apparatus which is simultaneously robust to an impact of the work apparatus is possible.

This object is achieved by a handheld, battery-operated work apparatus including a housing; a work tool arranged on the housing; a bale handle which at least partially engages at least one of around and over the housing; the housing having a back end to which an operator-control region of the housing is assigned; the housing having a front end on which the work tool is arranged; the housing extending along a longitudinal axis from the back end to the front end; an operator-controlled element for operation of an electric motor of the work apparatus arranged in the operator-control region; wherein the work apparatus is configured so that it can be stored in a storage position on a horizontal plane; wherein the work apparatus defines a longitudinal plane which in the storage position runs perpendicular to the horizontal plane and contains the longitudinal axis; the operator-control region defining a handle opening which penetrates fully through the housing in a direction transverse to the longitudinal plane; the handle opening having, in a direction of the longitudinal axis, a distance point with a largest distance measured in the direction of the longitudinal axis to the back end of the housing; the operator-control region extending in the direction of the longitudinal axis from the back end of the housing up to the distance point; the housing having a frontal region extending in the direction of the longitudinal axis from the distance point up to the front end; the housing defining an imaginary tangential plane which is only tangent to the housing; the imaginary tangential plane running perpendicular to the longitudinal plane; the imaginary tangential plane being tangent to the bale handle; and, the imaginary tangential plane being tangent to the housing in the operator-control region of the housing.

This object is achieved by a handheld, battery-operated work apparatus including: a housing having a front end; a work tool arranged on the front end of the housing; the housing having a back end to which an operator-control region of the housing is assigned; the housing extending along a longitudinal axis from the back end to the front end; an operator-controlled element for operation of an electric motor of the work apparatus being arranged in the operator-control region; the work apparatus being configured so that it can be stored in a storage position on a horizontal plane; the work apparatus defining a longitudinal plane which in the storage position runs perpendicular to the horizontal plane and contains the longitudinal axis; the housing having a battery shaft; a further operator-controlled element disposed in the operator-control region of the housing; the further operator-controlled element protruding out of an operator-controlled element opening in the operator-control region in the storage position in a direction away from the horizontal plane; a hand guard for bearing the hand when actuating the operator-controlled element formed by the housing in the operator-control region; the operator-controlled element opening, in the storage position in a side view perpendicular to the longitudinal plane, having a low point corresponding to a point of the operator-controlled element opening having a smallest distance (d2) to the horizontal plane; the work apparatus defining an imaginary touch plane running perpendicular to the longitudinal plane through the low point and tangent to the battery shaft; and, the hand guard protruding beyond the imaginary touch plane.

The disclosure according to an embodiment provides that an imaginary tangential plane of the housing is tangent to the bale handle and the housing in the operator-control region. In particular, the imaginary tangential plane is tangent to the operator-control region of the housing in a side view perpendicular to the longitudinal plane at a touch point. The tangential plane is only tangent to the housing. The tangential plane of the housing does not intersect the housing. The operator-control region extends, in particular in the perspective perpendicular to the longitudinal plane, in the direction of the longitudinal axis of the housing. The work tool is arranged at the front end of the housing in relation to the longitudinal axis. The operator-control region is assigned to the back end of the housing in relation to the longitudinal axis. The operator-controlled element for operating the electric motor is arranged in the operator-control region. The handle opening is arranged in the operator-control region. The operator-control region extends in the direction of the longitudinal axis of the housing from the back end of the housing up to the distance point. The distance point is the point or the position of the handle opening which possesses the largest distance measured in the direction of the longitudinal axis to the back end of the housing. In particular, the housing has a frontal region which extends in the direction of the longitudinal axis from the distance point to the front end of the housing. In particular, the housing is divided in the direction of the longitudinal axis exclusively into two main regions, namely into the operator-control region and the frontal region. The handle opening penetrates through the housing in the direction transverse to the longitudinal plane, in particular in a direction entirely perpendicular to the longitudinal plane. The longitudinal plane contains the longitudinal axis. The longitudinal plane runs perpendicular to the horizontal plane in the storage position of the work apparatus. The work apparatus is configured so that it can be stored in the storage position provided for this purpose on the horizontal plane. In particular, the work apparatus possesses a storage surface. The horizontal plane runs in the horizontal. The bale handle engages at least partially around the housing. In particular, the bale handle engages over the housing. The imaginary tangential plane does not intersect the bale handle. In particular, the imaginary tangential plane is not tangent to the housing in the storage position on that side of the work apparatus which faces away from the horizontal plane.

Due to the fact that the imaginary tangential plane bears against the bale handle of the work apparatus and is tangent to the housing in the operator-control region, the region of the housing which is arranged in the direction of the longitudinal axis between the distance point and the front end of the housing is protected in the event of an impact of the work apparatus. No parts of the housing protrude beyond the imaginary tangential plane in this intermediate region. The intermediate region is protected in particular in the event of an impact of the motor chainsaw with the imaginary tangential plane onto the horizontal plane. In the case of such an impact, the normal of the tangential plane is in particular perpendicular to the horizontal plane. The work apparatus accordingly falls onto the horizontal plane so that the imaginary tangential plane contacts the horizontal plane superficially in the event of initial contact.

The imaginary tangential plane is tangent to the operator-control region at a touch point. In particular, the touch point is the point of the operator-control region with the largest distance to the horizontal plane.

The tangential plane possesses a first side and a second side. In the storage position of the work apparatus, the first side faces the horizontal plane. The frontal region of the housing is preferably arranged exclusively on the first side of the imaginary tangential plane. As a result of this, the frontal region, in particular a battery shaft arranged in the frontal region, is protected in the event of an impact.

In particular, the frontal region has a frontal region distance to the imaginary tangential plane. The frontal region distance is advantageously selected to be small and the work apparatus is configured so that the frontal region of the housing can contact the horizontal plane in the event of an impact of the work apparatus with the imaginary tangential plane on the horizontal plane. As a result, the frontal region, in particular a battery shaft arranged in the frontal region, can serve as a support point in the event of an impact of the work apparatus, via which support point energy can be absorbed into the housing. As a result of this, the energy which must be absorbed into the housing in the event of an impact of the work apparatus is distributed to several points.

The imaginary tangential plane is tangent to the operator-control region of the housing in the storage position in a side view perpendicular to the longitudinal plane at the touch point. The frontal region distance is advantageously smaller than 10% of the distance of the touch point to the horizontal plane. In particular, the frontal region distance is smaller than 5%, preferably smaller than 3% of the distance of the touch point to the horizontal plane. In particular, the imaginary tangential plane touches the frontal region. In this case, the frontal region distance is 0% of the distance of the touch point to the horizontal plane. Due to the fact that the frontal region distance is selected to be small, the frontal region can serve as a support element of the housing in the event of an impact, in particular in the event of an impact of the tangential plane onto the horizontal plane.

In particular, a battery shaft is arranged in the frontal region of the housing so that the housing can enclose a battery. In particular, the battery shaft should not protrude beyond the imaginary tangential plane. The work apparatus and the battery shaft are advantageously configured so that a battery pack arranged in the battery shaft is arranged exclusively on the first side of the imaginary tangential plane. As a result, the battery pack is also protected in the event of an impact.

In a further development, the frontal region of the housing possesses an impact projection. The impact projection is in particular part of the housing. The impact projection protrudes in the direction of the tangential plane. The frontal region preferably has in the region of the impact projection the smallest distance to the tangential plane. In particular, the impact projection is part of the battery shaft. The impact projection preferably forms an outer wall of the battery shaft. In particular, the impact projection serves as an energy introduction point for energy into the housing of the work apparatus in the event of an impact of the work apparatus with the imaginary tangential plane on the horizontal plane in addition to the touch point of the tangential plane in the operator-control region of the housing and the bale handle.

The work apparatus advantageously includes an actuating element for ejecting a battery from the battery shaft. The work apparatus is preferably configured so that the actuating element is protected by the impact projection in the event of an impact of the work apparatus. In particular, the actuating element can have a larger distance to the imaginary tangential plane than the impact projection. As a result of this, it is ensured that the functionality of the actuating element is still maintained even after an impact of the work apparatus.

In a further development, the operator-control region has a hand guard for bearing the hand when actuating the operator-controlled element. The imaginary tangential plane is advantageously tangent to the operator-control region at the hand guard. As a result of this, the hand guard can simultaneously be used as an energy introduction point or energy introduction position in the event of an impact of the work apparatus.

The hand guard is preferably formed as a projection of the operator-control region. In particular, the hand guard is substantially hump-shaped. As a result, the work apparatus can roll over the projection of the operator-control region in the event of an impact and subsequently also absorb energy via the bale handle.

A battery can be inserted in the battery shaft in an insert direction. The insert direction preferably runs parallel to the longitudinal plane. The insert direction in the storage position is advantageously inclined at an angle of 80° to 90° with respect to the horizontal plane. It can also be provided that the insert direction is perpendicular to the horizontal plane. In particular, the battery shaft has an insertion opening. The insertion opening in the storage position is preferably arranged on that side of the work apparatus which faces away from the horizontal plane. In particular, the insertion opening opens the battery shaft in the storage position in the direction away from the horizontal plane. An ergonomic and balanced configuration of the work apparatus is possible as a result of this arrangement of the battery pack. The battery pack can be arranged, for example, at the center of gravity of the work apparatus. The insertion and removal of the battery pack in and out of the battery shaft is possible from above in a comfortable manner in the storage position. In particular, the battery shaft is formed so that the housing encloses a battery received in the battery shaft.

In a further development, the work apparatus has in the operator-control region a further operator-controlled element. The further operator-controlled element preferably serves to unlock the operator-controlled element or to hold a locking element in an unlocking position. In particular, the further operator-controlled element is a locking element for locking the operator-controlled element or a holding element. The locking element is in particular provided so that the operator-controlled element can only be actuated when the locking element is also simultaneously actuated. The holding element, upon actuation, preferably holds the locking element in an unlocking position in which actuation of the operator-controlled element is possible. In particular, the further operator-controlled element is arranged at the operator-control region of the housing. The touch point of the imaginary tangential plane advantageously lies at the operator-control region of the housing in the side view perpendicular to the longitudinal plane in relation to the direction of the longitudinal axis between the further operator-controlled element and the frontal region. As a result, the energy introduction points formed by the bale handle and at the touch point can lie close to one another in relation to the direction of the longitudinal axis. As a result of this, a robust work apparatus is produced which can effectively absorb the energy to be absorbed in the event of an impact.

In an alternative solution according to the disclosure which achieves the above-mentioned object via a work apparatus according to a second embodiment, the hand guard protrudes beyond the imaginary touch plane. The imaginary touch plane runs perpendicular to the longitudinal plane. The imaginary touch plane is tangent to the battery shaft. The imaginary touch plane runs through the low point. A further operator-controlled element is provided in the operator-control region of the housing. The further operator-controlled element can be in particular a locking element for locking the operator-controlled element or a holding element. The locking element is in particular provided so that the operator-controlled element can only be actuated when the locking element is simultaneously also actuated. Upon actuation, the holding element preferably holds the locking element in an unlocking position in which the actuation of the operating element is possible. The further operator-controlled element projects out of an operator-controlled element opening in the operator-control region. The further operator-controlled element protrudes out of the operator-controlled element opening in the direction away from the horizontal plane. In the storage position of the work apparatus, the operator-controlled element opening has the low point in a side view perpendicular to the longitudinal plane. The low point corresponds to the point of the operator-controlled element opening which in the storage position has the smallest distance to the horizontal plane. It can be provided that the low point is a low position. In the case of the work apparatus according to the second embodiment too, a hand guard for bearing the hand upon actuation of the operator-controlled element is formed by the housing in the operator-control region. The housing has a battery shaft. In contrast to the tangential plane of the housing, the touch plane intersects the housing.

Due to the fact that the hand guard protrudes beyond the imaginary touch plane, the battery shaft is protected in the event of an impact of the work apparatus, in the case of which the work apparatus is moved toward the horizontal plane so that the normal of the touch plane runs parallel to the normal of the horizontal plane. As a result, the battery shaft can be configured in an installation space-saving manner.

In particular, the operator-controlled element opening in the storage position is arranged on that side of the handle housing which faces away from the horizontal plane.

The battery shaft advantageously has an outer wall which is tangent to the imaginary touch plane. In an advantageous further development of the subject matter according to the second embodiment of the disclosure, the hand guard is formed as a projection of the operator-control region of the housing. In particular, the hand guard is substantially hump-shaped.

The touch plane preferably intersects the hand guard. The subject matter according to the second embodiment of the disclosure can also be further developed in such a manner that a battery can be inserted into the battery shaft in an insert direction and that the insert direction runs parallel to the longitudinal plane. In particular, it can be provided that the battery shaft has an insertion opening and that the insertion opening in the storage position is arranged on that side of the work apparatus which faces away from the horizontal plane.

BRIEF DESCRIPTION OF DRAWINGS

The invention will now be described with reference to the drawings wherein.

DETAILED DESCRIPTION

FIGS. 1 to 6 show handheld work apparatuses 1. The handheld work apparatuses 1 are battery-operated. In the embodiments according to FIGS. 1 to 4A, the handheld work apparatus 1 is a motor chainsaw. In the embodiment according to FIG. 5, the handheld work apparatus 1 is a hedge shears. In the embodiment according to FIG. 6, the handheld work apparatus 1 is an angle grinder. The following description applies in principle to all the embodiments. Where an indication is supposed to relate solely to one of the three embodiments, this is explicitly indicated.

The work apparatus 1 is handheld during operation as intended. The work apparatus 1 is a portable work apparatus. The term "portable" should be understood in this context such that the work apparatus can be carried during operation as intended. During operation of the work apparatus 1, it is not necessary that the work apparatus is supported by a device or a workpiece. The work apparatus 1 can be carried by the operator alone during operation as intended.

The work apparatus 1 includes a housing 40. The work apparatus 1 includes a work tool 39. The work tool 39 is arranged on the housing 40. In the embodiment, the work tool 39 is fastened to the housing 40. In the embodiment according to FIGS. 1 to 4A, the work tool is formed by a guide bar 5 and a saw chain 6. In the embodiment according to FIG. 5, the work tool 39 is formed by a cutter bar. In the embodiment according to FIG. 6, the work tool 39 is formed by a saw blade.

The work apparatus 1 includes an electric motor 4. The electric motor 4 serves to drive the work tool 39. In the embodiment according to FIGS. 1 to 4A, the saw chain 6 is driven circumferentially about the guide bar 5 by means of the electric motor 4. The electric motor 4 is arranged in the housing 40.

The work apparatus 1 includes a bale handle 8. The bale handle 8 partially engages around the housing 40. It can also be provided that the bale handle fully engages around the housing. The bale handle 8 engages over the housing 40. When the work apparatus 1 is operated as intended, the operator can engage around the bale handle 8 from above. The bale handle 8 is a guard handle.

The housing 40 has a back end 31. The back end 31 faces the user during operation of the work apparatus 1. The housing 40 has a front end 32. The front end 32 of the housing 40 faces the operator when the work apparatus 1 is used as intended. The work tool 39 is arranged on the front end 32. In the embodiments, the housing 40 encloses a coherent inner space. The housing 40 is formed from two half-shells. The half-shells bear against one another in a separating plane. It can, however, also be provided that the housing encloses two inner spaces which are formed separately from one another. In particular, the housing can include a motor housing and a handle housing which are formed separately from one another. The electric motor and the battery shaft are then arranged in the motor housing. The motor housing and the handle housing can be connected to one another via a vibration gap and anti-vibration elements which bridge the vibration gap. In this case, the housing includes four half-shells.

The housing 40 includes in each case an operator-control region 2. The operator-control region 2 is assigned to the back end 31 of the housing 40. An operator-controlled element 15 is arranged in the operator-control region 2. The operator-controlled element 15 serves to operate the electric motor 4 of the work apparatus 1.

Figure 1:
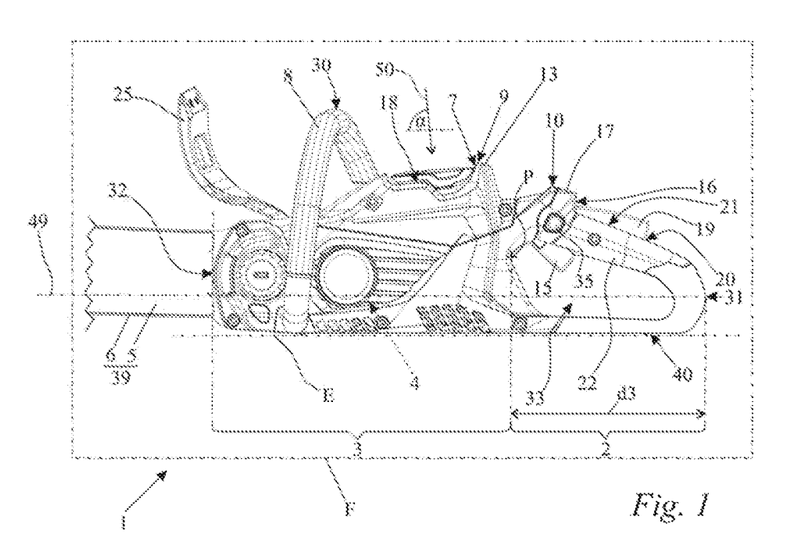
FIG. 1 shows a schematic side view of a work apparatus formed as a motor chainsaw.
Figure 2:
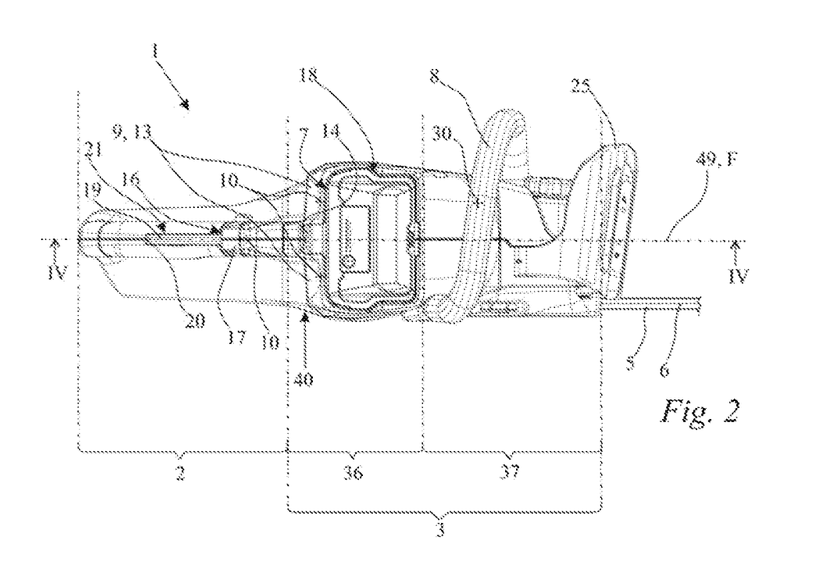
FIG. 2 shows a schematic plan view from above of the work apparatus from FIG. 1.

As represented in particular in FIGS. 1 and 2, the housing 40 extends along a longitudinal axis 49. The longitudinal axis 49 extends from the back end 31 of the housing 40 to the front end 32 of the housing 40. The longitudinal axis 49 runs in all the embodiments parallel to a work tool plane. In the embodiments according to FIGS. 1 to 4A, the longitudinal axis 49 runs parallel to the plane of the guide bar 5. In the embodiment according to FIG. 5, the longitudinal axis 49 runs parallel to the plane in which the cutter bars move to and fro. In the embodiment according to FIG. 6, the longitudinal axis 49 runs parallel to the plane of the saw blade. The longitudinal axis 49 can also be referred to as a longitudinal central axis of the housing 40.

The work apparatus 1 is configured so that it can be stored in a storage position provided for this purpose on a horizontal plane E. It can be provided that the work apparatus 1 has a storage surface for storing the work apparatus 1 in the storage position. In the embodiments, the work apparatus 1 has storage projections on which it can be stored on the horizontal plane E. In the storage position, the work apparatus 1 can be stored on the horizontal plane E in such a manner that the bale handle 8 can be gripped around from above by the operator. In this manner, the work apparatus 1 can be rapidly and easily lifted and received. The horizontal plane E runs in the horizontal. The longitudinal axis 49 runs parallel to the horizontal plane E in the storage position.

The work apparatus 1 possesses a longitudinal plane F. In the storage position, the longitudinal plane F runs perpendicular to the horizontal plane E. The longitudinal plane F contains the longitudinal axis 49. The longitudinal plane F is also referred to as the longitudinal central plane. It can be provided that the housing 40 along the longitudinal plane F is made of two housing halves to form the housing 40. In this case, the longitudinal plane F is referred to as a separating plane of the housing 40 or as a division plane of the housing 40. In the embodiments according to FIGS. 1 to 4A, the longitudinal plane F runs parallel to the plane of the guide bar 5. In the embodiment according to FIG. 5, the longitudinal plane F runs perpendicular to the plane in which the cutter bars move against one another. In the embodiment according to FIG. 6, the longitudinal plane F runs parallel to the plane of the saw blade.

The housing 40 has a handle opening 33. The handle opening 33 is arranged in the operator-control region 2 of the housing 40. The handle opening 33 penetrates fully through the housing 40. The handle opening 33 penetrates through the housing 40 in the direction transverse to the longitudinal plane F. The handle opening 33 penetrates through the housing 40 in the embodiment in the direction perpendicular to the longitudinal plane F. The handle opening 33 has a distance point P represented in FIGS. 1 and 4. The distance point P is arranged at the edge of the handle opening 33. The distance point P has the largest distance measured in the direction of the longitudinal axis 49 to the back end 31 of the housing 40. The distance point P is the point of the handle opening 33 which has the largest distance d3 measured in the direction of the longitudinal axis 49 to the back end 31 of the housing 40.

The operator-control region 2 of the housing 40 extends in the direction of the longitudinal axis 49 from the back end 31 of the housing 40 up to the distance point P. A handle 22 is formed by the housing 40 in the operator-control region 2. The handle 22 can be gripped around by the user in the operator-control region 2. For this purpose, the operator can push his or her hand through the handle opening 33.

The housing 40 has a frontal region 3. The frontal region 3 is arranged in the direction of the longitudinal axis 49 between the distance point P and the front end 32 of the housing 40. In the embodiments, the frontal region 3 of the housing 40 extends in the direction of the longitudinal axis 49 from the distance point P of the handle opening 33 up to the front end 32 of the housing 40. In the embodiments, the housing 2 is divided exclusively into the operator-control region 2 and the frontal region 3.

The work apparatus 1 includes a battery shaft 7. The battery shaft 7 is formed by the housing 40. The battery shaft 7 is arranged in the frontal region 3 of the housing 40. The battery shaft 7 is delimited by an outside of the housing 40. The work apparatus 1 is preferably configured so that the battery shaft 7 encloses a battery pack, not represented, which is inserted into the battery shaft 7 in relation to a circumferential direction about the insert direction 50 so that only one end side of the battery pack is visible from outside the battery shaft 7.

Figure 4:
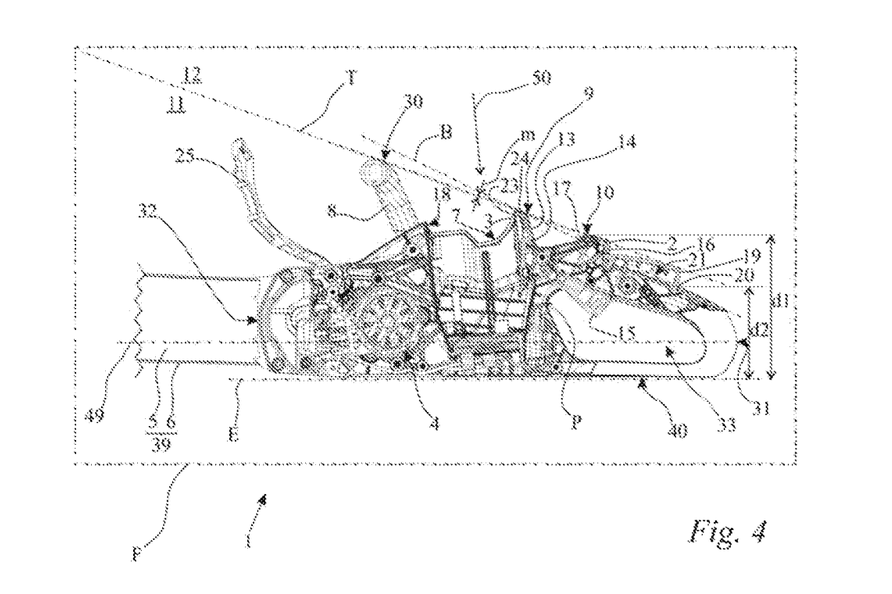
FIG. 4 shows a schematic sectional representation of a section along the sectional surface IV-IV plotted in FIG. 2.

The housing 40 possesses an imaginary tangential plane T represented, for example, in FIG. 4. The imaginary tangential plane T is only tangent to housing 40. The imaginary tangential plane T only bears against the housing 40. The imaginary tangential plane T does not intersect the housing 40. The imaginary tangential plane T runs perpendicular to the longitudinal plane F. The imaginary tangential plane T is tangent to the bale handle 8. The bale handle 8 is not a component of the housing 40. In all the embodiments, the imaginary tangential plane T of the housing is tangent to the housing 40 in the operator-control region 2 of the housing 40. The imaginary tangential plane T does not intersect the bale handle 8. The imaginary tangential plane T bears against the bale handle 8.

Figure 3:
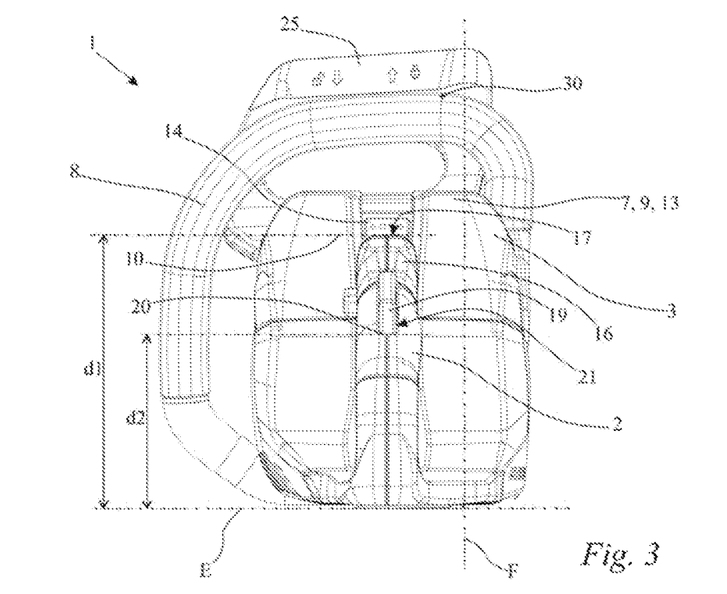
FIG. 3 shows a view of the back end of the housing of the work apparatus from FIGS. 1 and 2.

The bale handle 8 engages over the housing 40 in such a manner that the bale handle 8 crosses through the longitudinal plane F, as represented in FIG. 3. The bale handle 8 is also referred to as a guard handle. The bale handle 8 is arranged in the frontal region of the housing 40. The bale handle 8 is arranged on the housing 40, fastened in the embodiments. The bale handle 8 is connected with its two longitudinal ends to the housing 40, in the embodiment to the frontal region of the housing 40. In relation to the direction of the longitudinal axis 49, the battery shaft 7 is arranged between the bale handle 8 and the operator-control region 2 of the housing 40.

As represented in FIG. 4, the tangential plane T possesses a first side 11 and a second side 12. In the storage position of the work apparatus 1, the first side 11 of the imaginary tangential plane T faces the horizontal plane E. The frontal region 3 of the housing 40 is arranged exclusively on the first side 11 of the imaginary tangential plane T. The imaginary tangential plane T does not intersect the frontal region 3. The frontal region 3 does not penetrate through the imaginary tangential plane T. The battery shaft 7 is arranged exclusively on the first side 11 of the imaginary tangential plane T. The imaginary tangential plane T does not intersect the battery shaft 7. The battery shaft 7 does not penetrate through the tangential plane T.

Figure 4A:
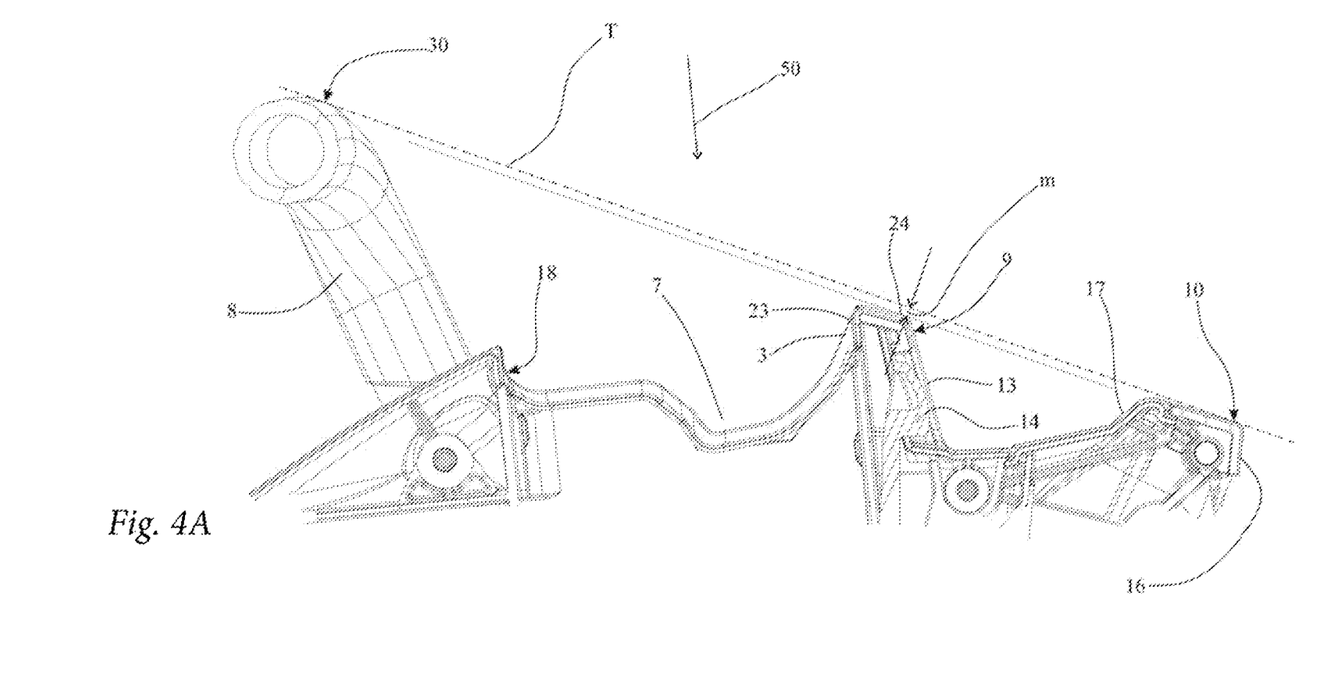
FIG. 4A shows an enlarged detail from FIG. 4.

The frontal region 3 has a frontal region distance m to the imaginary tangential plane T, as plotted in FIG. 4 and in FIG. 4A by way of example for all the embodiments. The battery shaft 7 has the frontal region distance m to the imaginary tangential plane T, as plotted in FIG. 4 and in FIG. 4A by way of example for all the embodiments. The frontal region distance m is measured perpendicular to the imaginary tangential plane T. The frontal region distance m corresponds to the distance of the frontal region 3 of the housing 40 from the imaginary tangential plane T. The frontal region distance m is selected and the work apparatus 1 is configured so that the frontal region 3 of the housing 40 can contact the horizontal plane E in the event of an impact of the work apparatus 1 with the imaginary tangential plane T on the horizontal plane E. The frontal region distance m is in the embodiment selected and the work apparatus 1 is configured so that the battery shaft 7 can contact the horizontal plane E in the event of an impact of the work apparatus 1 with the imaginary tangential plane T on the horizontal plane E. In the event of such an impact of the work apparatus with the imaginary tangential plane T on the horizontal plane E, the work apparatus 1 can deform elastically in such a manner that the work apparatus 1 can absorb the energy of the impact at three points. These three points include the bale handle 8, the frontal region 3 and the operator-control region 2 of the housing 40. The position in the frontal region 3 of the housing is in particular the battery shaft 7.

In the event of a hypothetical impact of the work apparatus 1 with the tangential plane T on the horizontal plane E, it is assumed that the normals of the tangential plane T and the horizontal plane E point in the same direction. In the case of such a hypothetical impact of the work apparatus 1 on the horizontal plane E, the work apparatus 1 contacts the horizontal plane E firstly with the operator-control region 2 of the housing 40 and the bale handle 8. As a result of an elastic deformation of the work apparatus 1, a contact between the frontal region 3, in the embodiments between the battery shaft 7 and the horizontal plane E, also arises thereafter. The work apparatus 1 is then supported with three positions with respect to the horizontal plane E. The energy of the impact can be absorbed by the work apparatus 1 at three points. The work apparatus 1 is configured so that the potential energy of the work apparatus 1 at a height of 1 m above the horizontal plane E is adequate for the described elastic deformation of the work apparatus 1. In order to enable the described elastic deformation during an impact of the work apparatus 1, the materials of the work apparatus 1, in particular the materials of the bale handle 8 and of the housing 40, are correspondingly selected and the form of the work apparatus 1 is correspondingly configured. In the embodiments, the housing 40, in particular the operator-control region 2 of the housing 40, is made of plastic. The housing is made up of injection molded parts, in the embodiments of two half-shells. The bale handle 8 is made of plastic. It can also be provided that the bale handle possesses a tubular core made of metal, in particular of aluminum. In this case, the bale handle can be sheathed by plastic.

In a more realistic impact scenario, the work apparatus 1 comes up either firstly with the operator-control region 2 of the housing 40 or with the bale handle 8 on the horizontal plane E. A rotational movement of the work apparatus 1 about an axis of rotation parallel to the horizontal plane E subsequently takes place so that the work apparatus 1 then contacts the horizontal plane E with the bale handle 8 or the operator-control region 2 of the housing 40 depending on which of the two regions the horizontal plane E has not contacted first. It can also arise that the work apparatus 1, after the rotation in the case of the first contact of the region which has not contacted the horizontal plane E first with the horizontal plane E, contacts the horizontal plane E at the same point in time as the operator-control region 2 of the housing 40 and the bale handle 8. As a result, the work apparatus 1 is elastically deformed in such a manner that it also bears with the battery shaft 7 against the horizontal plane E. In this impact scenario too, the energy is then introduced at three points into the work apparatus 1.

The work apparatus 1 has, in the case of the embodiment according to FIGS. 1 to 4, a hand protection guard 25. The hand protection guard 25 is not a component of the housing 40. The hand protection guard 25 is mounted pivotably on the housing 40. The hand protection guard 40 can protrude beyond the imaginary tangential plane T. The hand protection guard 25 can be pivoted in the event of an impact of the work apparatus 1 with the imaginary tangential plane T onto the horizontal plane. As a result of the evasive movement of the hand protection guard 25 in the event of such an impact, the hand protection guard 25 is protected from damage. In the embodiment according to FIGS. 1 to 4A, the hand protection guard 25 is advantageously operatively connected to a brake, not represented, of the electric motor 4 of the work apparatus 1.

Figure 6:
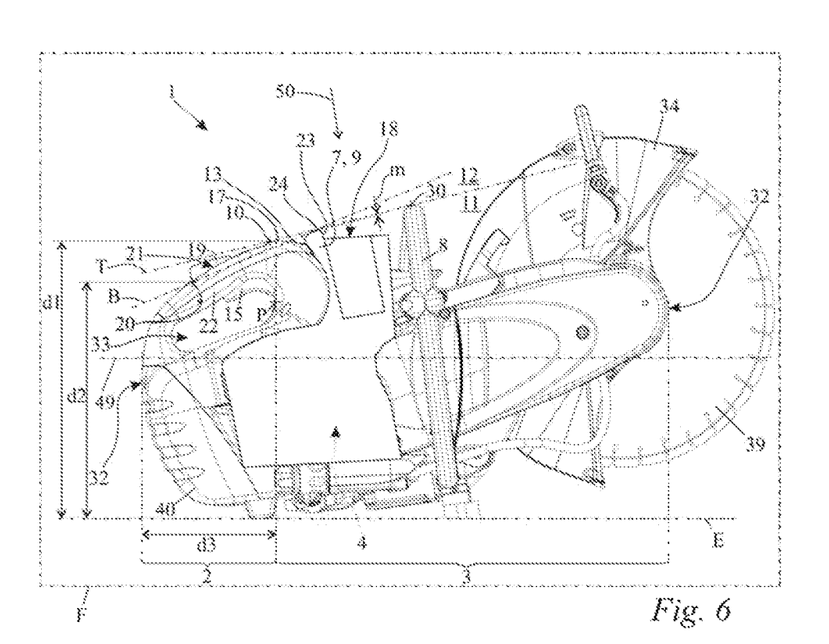

In the embodiment according to FIG. 6, the work apparatus 1 has a protective cover 34. The protective cover 34 at least partially surrounds the work tool 39. As a result, the operator is protected from the work tool 39 and from cut material. The protective cover 34 is not a component of the housing 40. In the schematic representation according to FIG. 6, the protective cover 34 does not protrude beyond the tangential plane T. In actual fact, the protective cover is, however, only arranged on the first side 11 of the imaginary tangential plane.

As represented in particular in FIG. 4 and FIG. 4A, the first tangential plane T is tangent to the operator-control region 2 of the housing 40 in the storage position in a side view perpendicular to the longitudinal plane F in the case of all embodiment at a touch point 10. The touch point 10 possesses the distance d1 to the horizontal plane E. The frontal region distance m represented in particular in FIG. 4A is smaller than 10% of the distance dl of the touch point 10, represented, for example, in FIG. 4, to the horizontal plane E. In particular, the frontal region distance m is smaller than 3% of the distance dl of the touch point 10 to the horizontal plane E. In the embodiments, the frontal region distance m is smaller than 3% of the distance dl of the touch point 10 to the horizontal plane E. It can also be provided that the frontal region distance m is 0% of the distance dl of the touch point 10 to the horizontal plane E. In this case, the imaginary tangential plane T is tangent to the operator-control region 2. In the embodiments, the imaginary tangential plane T is tangent to the battery shaft 7.

The housing 40 possesses an impact projection 9. The impact projection 9 of the housing 40 is arranged in the frontal region 3 of the housing 40. The impact projection 9 is formed by the frontal region 3 of the housing 40. The impact projection 9 protrudes in the direction of the imaginary tangential plane T. The impact projection 9 is a projection of the frontal region 3 of the housing 40. The impact projection 9 is delimited on both sides by regions of the housing 40 in relation to the direction of the longitudinal axis 49, which regions have a larger distance to the tangential plane T than the impact projection 9. The frontal region 3 has, in the region of the impact projection 9, the smallest distance to the imaginary tangential plane T. The frontal region 3 has, in the region of the impact projection 9, the frontal region distance m to the tangential plane T. The impact projection 9 possesses the frontal region distance m to the imaginary tangential plane T. The impact projection 9 is arranged exclusively on the first side 11 of the imaginary tangential plane T. The impact projection 9 possesses an impact surface 24. The impact surface 24 runs in the embodiments parallel to the imaginary tangential plane T. In the event of an impact of the work apparatus 1 with the tangential plane T onto the horizontal plane E, the impact projection 9 can bear with the impact surface 24 at least briefly superficially against the horizontal plane E and thus be supported. Energy can be introduced into the housing in the process.

The impact projection 9 is arranged between the bale handle 8 and the operator-control region 2 of the housing 40 in relation to the direction of the longitudinal axis 49. The impact projection 9 is arranged closer to the operator-control region 2 of the housing 2 than to the bale handle in relation to the direction of the longitudinal axis 49. The imaginary tangential plane T bears at a bearing point 30 against the bale handle 8. The imaginary tangential plane T is tangent to the bale handle 8 at the bearing point 30. The impact projection 9 is arranged closer to the operator-control region 2 of the housing 40 than to the bearing point 30 of the bale handle 8 in relation to the direction of the longitudinal axis 49. A distance measured in the direction of the longitudinal axis 49 between the impact project 9 and the bearing point 30 of the tangential plane T on the bale handle 8 is at least twice as large as the distance measured in the direction of the longitudinal axis 49 between the impact projection 9 and the distance point P of the handle opening 33.

The frontal region 3 can be divided into a battery region 36 and a guard region 37, as represented by way of example for all the embodiments in FIG. 2, in relation to the direction of the longitudinal axis 49. The guard region 37 is assigned to the front end 32 of the housing 40. The battery region 36 is arranged between the guard region 37 and the operator-control region 2 in relation to the direction of the longitudinal axis 49. The battery region 36 adjoins the operator-control region 2. The battery region 36 adjoins the guard region 37. The bale handle 8 is arranged fully in the guard region 37 in the embodiments. The bale handle 8 is connected to the housing 40 in the guard region 37. The battery shaft 7 is arranged fully in the battery region 36 in the embodiments.

The operator-control region 2 extends from 35% to 45% of the total extent of the housing 40 measured in the direction of the longitudinal axis 49. The frontal region 3 extends from 55% to 65% of the total extent of the housing 40 measured in the direction of the longitudinal axis 49. The battery region 36 extends from 20% to 30% of the total extent of the housing 40 measured in the direction of the longitudinal axis 49. The guard region 37 extends from 30% to 40% of the total extent of the housing 40 measured in the direction of the longitudinal axis 49.

The bearing point 30 of the bale handle 8 against the tangential plane T is arranged in the guard region 37. The touch point 10 is arranged in the operator-control region 2. The impact surface 24 represented in FIG. 4A is arranged in the battery region 36.

In the case of the described impact, the work apparatus 1 bears initially in the guard region 37 with the bearing point 30 (which can also be a location extended along an axis) of the bale handle 8 and in the operator-control region 2 with the touch point 10 (which can also be a location extended along an axis) against the horizontal plane E (FIG. 4). After the elastic deformation of the work apparatus 1, the work apparatus 1 bears additionally in the battery region 36 with the impact surface 24 represented in FIG. 4A against the horizontal plane E. In the event of this impact, the touch point 10, the impact surface 24 and the bearing point 30 form supporting points or supporting positions for the introduction of energy into the work apparatus 1.

The impact projection 9 is part of the battery shaft 7. The battery shaft 7 is formed so that it can enclose the battery which can be inserted therein. The impact projection 9 delimits the battery shaft 7. The impact projection 9 is formed by an edge of the battery shaft 7. The impact projection 9 is part of a closed edge, running around the insert direction 50 of the battery shaft 7, of the battery shaft 7. The impact projection 9 forms an outer wall 13 of the battery shaft 7. The impact projection 9 is arranged between an inner wall 23 and an outer wall 13 of the battery shaft 7. The inner wall of the battery shaft is intended for bearing against a battery which can be introduced into the battery shaft 7. The impact surface 24 extends between the inner wall 23 and the outer wall 13. The impact projection 9 possesses a larger distance to the horizontal plane E than the touch point 10 between the tangential plane T and the operator-control region 2 of the housing 40. The impact projection 9 possesses a smaller distance to the horizontal plane than the bearing point of the tangential plane T on the bale handle 8. The imaginary tangential plane T is inclined in the storage position of the work apparatus 1 in the direction from the front end 32 of the housing 40 toward the back end 31 to the horizontal plane E.

In the embodiment according to FIGS. 1 to 4A, the frontal region 3 of the housing 40 includes a cover. The cover at least partially forms the battery shaft 7. The impact projection 9 is formed by the cover. The cover includes two half-shells. The two half-shells are composed along a separating plane.

The work apparatus 1 includes an actuating element 14. The actuating element 14 serves to eject a battery from the battery shaft 7. The work apparatus 1 is configured so that the actuating element 14 is protected by the impact projection 9 in the event of an impact of the work apparatus 1. This is apparent in particular in FIGS. 3 and 4. As is apparent in FIG. 3, the touch point 10 in the embodiments is a touch position which extends along a straight line. Only in a side view perpendicular to the longitudinal plane F is this touch position a touch point. In an analogous manner, the impact projection 9 extends along a straight line. In the embodiment according to FIG. 3, the actuating element 14 for ejecting the battery from the battery shaft 7 is arranged between two projections which form the impact projection 9. As a result of this, the actuating element 14 is protected. In addition, the distance of the actuating element 14 to the imaginary tangential plane T is larger than the distance of the impact projection 9 to the imaginary tangential plane T. This is represented in FIG. 4.

The work apparatus 1 includes a hand guard 16. The hand guard 16 is formed by the operator-control region 2 of the housing 40. The hand guard 16 serves to bear the hand of a user upon actuation of the operator-controlled element 15. The hand guard 16 prevents a movement of the hand of a user in the direction from the back end 31 to the front end 32 of the housing 40 relative to the housing 40 when operating the operator-controlled element 15. The imaginary tangential plane T is tangent to the operator-control region on the hand guard 16.

In the embodiment, the hand guard 16 is formed as projection 17 of the operator-control region 2 of the housing 40. The projection 17 of the operator-control region 2 protrudes in the direction of the tangential plane T. The projection 17 is delimited on both sides by regions of the housing 40 in relation to the direction of the longitudinal axis 49, which regions have a larger distance to the tangential plane T than the projection. The projection 17 is formed to be hump-shaped. A recess of the work apparatus 1 is formed in the housing 40 in relation to the direction of the longitudinal axis 49 between the projection 17 of the operator-control region 2 and the impact projection 9 of the frontal region 3 in relation to the imaginary tangential plane T.

A battery can be inserted into the battery shaft 7 in an insert direction 50. The battery is also referred to as a battery pack. The insert direction 50 runs in the storage position transversely to the horizontal plane E. The insert direction 50 runs parallel to the longitudinal plane F. It can alternatively also be provided that the insert direction runs transversely, in particular perpendicular to the longitudinal plane F.

The battery shaft 7 has an insertion opening 18. The battery can be inserted through the insertion opening 18 into the battery shaft 7. The insertion opening 18 is, in the storage position, arranged on that side of the work apparatus 1 which faces away from the horizontal plane E. The insertion opening 18 opens the battery shaft 7 in the direction away from the horizontal plane E. The insertion opening 18 possesses a closed edge which runs around the insert direction 50. In order to insert the battery into the battery shaft 7, the battery must be guided through the insertion opening 18, in particular through the closed circumferential edge. As a result, the battery is mounted in a secure and protected manner.

The insert direction 50 in the storage position is advantageously inclined at an angle α of 80° to 90° ith respect to the horizontal plane E, as represented in FIG. 1. It can also be provided that the insert direction 50 is perpendicular to the horizontal plane E. In the embodiment, the insert direction 50 in the storage position runs toward the horizontal plane E. In the direction of the horizontal plane E, the insert direction 50 is inclined in the embodiment to the back end 31. It can, however, also be provided that the insert direction is inclined in the direction of the horizontal plane E away from the back end 31.

As represented in FIGS. 1, 4, 5 and 6, the work apparatus 1 has a further operator-controlled element 19. The work apparatus 1 has a locking element 35 represented by way of example for all embodiments in FIG. 1. The locking element 35 serves to lock the operator-controlled element 15 for operating the electric motor. The work apparatus 1 is advantageously configured so that the operator-controlled element 15 can only be actuated if the locking element 35 is in an unlocking position. The locking element can be pushed into the unlocking position by the operator. In this case, a spring force must be overcome. So that the operator does not have to permanently hold the locking element 35 in the unlocking position, the further operator-controlled element 19 is provided. In the embodiments, the further operator-controlled element 19 is a holding element. The locking element 35 can comfortably be held in the unlocking position with the holding element. In the case of an actuated holding element, a pushing of the locking element 35 into the unlocking position is no longer permanently necessary, rather only initially. After initial pushing of the locking element 35 into the unlocking position, the locking element 35 can be held via permanent actuation of the holding element in the unlocking position, preferably mechanically.

It can also be provided that the further operator-controlled element 19 is a locking element. The further operator-controlled element 19 preferably protrudes in the direction away from the horizontal plane E out of the operator-control region 2 of the housing 40. The further operator-controlled element is not a component of the housing 40.

The further operator-controlled element 19 is arranged in the operator-control region 2 of the housing 40. The work apparatus 1 includes an operator-controlled element opening 21. The operator-controlled element opening 21 is arranged in the housing 40. The operator-controlled element opening 21 fully penetrates through an outer wall of the housing 40. The operator-controlled element opening 21 is arranged in the operator-control region 2 of the housing 40. The operator-controlled element opening 21 is, in the storage position, arranged on that side of the work apparatus 1 which faces away from the horizontal plane E. The further operator-controlled element 19 protrudes out of the operator-controlled element opening 21.

The touch point 10 of the operator-control region 2 with the imaginary tangential plane T lies between the further operator-controlled element 19 and the frontal region 3 in relation to the direction of the longitudinal axis 49.

The touch point 10 of the operator-control region 2 with the imaginary tangential plane T lies between the operator-controlled element 21 and the frontal region 3 in relation to the direction of the longitudinal axis 49.

The operator-controlled element opening 21 has, in a side view perpendicular to the longitudinal plane F, a low point 20, as represented, for example, in FIG. 4. The low point 20 is, in the side view perpendicular to the longitudinal plane F, the point of the operator-controlled element opening 21 with the smallest distance d2 to the horizontal plane E. As is apparent from FIG. 3, the low point 20 is punctiform only in the side view perpendicular to the longitudinal plane F. In actual fact, the low point 20 is a low position which extends along a straight line. As represented in FIG. 4, an imaginary touch plane B runs perpendicular to the longitudinal plane F. The imaginary touch plane B runs through the low point 20. The imaginary touch plane B is tangent to the battery shaft 7. In contrast to the imaginary tangential plane T, the imaginary touch plane B intersects the housing 40. The hand guard 16 protrudes beyond the imaginary touch plane B.

The imaginary touch plane B intersects the hand guard 16.

The operator-controlled element opening 21 is, in the storage position, arranged on that side of the handle housing which faces away from the horizontal plane E. In the embodiment, the further operator-controlled element 19 is formed as a lever. The further operator-controlled element 19 is pretensioned with a spring in the embodiment. The pretensioning of the further operator-controlled element 19 acts in the storage position of the work apparatus 1 in the direction away from the horizontal plane E.

The imaginary touch plane B is tangent to the outer wall 13 of the battery shaft 7. The touch plane B is tangent to the impact projection 9.

The touch plane B intersects the projection 17. The hand guard 16 is formed on the projection 17. The hand guard 16 is arranged between the low point 20 and the battery shaft 7 in relation to the direction of the longitudinal axis 49. The hand guard 16 is arranged between the outer wall 13 of the battery shaft 7 and the low point 20 in relation to the direction of the longitudinal axis 49. The hand guard 16 is arranged between the impact projection 9 and the low point 20 in relation to the direction of the longitudinal axis 49.

Figure 5:
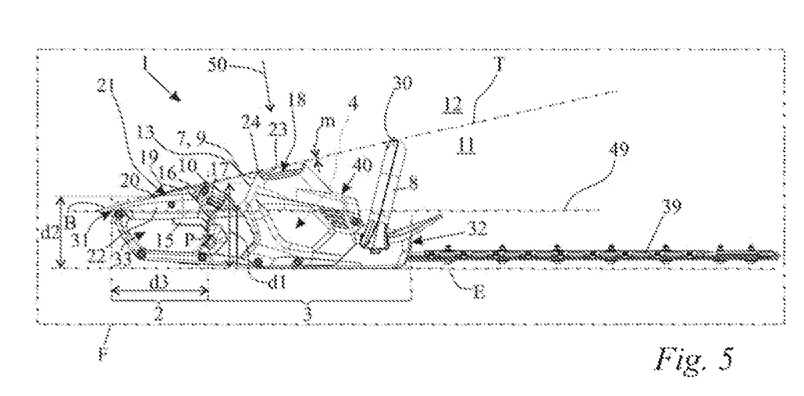
FIG. 5 shows a schematic side view of a work apparatus formed as hedge shears; and, FIG. 6 shows a schematic side view of a work apparatus formed as an angle grinder.

No actuating element 14 is apparent in the views according to FIGS. 5 and 6. In an analogous manner to the embodiment according to FIGS. 1 to 4, however, an actuating element 14 is present.

In the embodiment according to FIG. 6, no hand guard is shown. In an analogous manner to the embodiments according to FIGS. 1 to 5, however, a hand guard can be provided even in the case of the angle grinder according to FIG. 6. However, FIG. 6 shows a projection 17 against which the tangential plane T bears. The touch plane B intersects the projection 17.

It is understood that the foregoing description is that of the preferred embodiments of the invention and that various changes and modifications may be made thereto without departing from the spirit and scope of the invention as defined in the appended claims.

The invention claimed is:

1. A handheld, battery-operated work apparatus comprising:
a housing;
a work tool arranged on said housing;
a bale handle which at least partially engages at least one of around and over said housing;
said housing having a back end to which an operator-control region of said housing is assigned;
said housing having a front end on which said work tool is arranged;
said housing extending along a longitudinal axis from said back end to said front end;
an operator-controlled element for operation of an electric motor of the work apparatus arranged in said operator-control region;
wherein the work apparatus is configured so that it can be stored in a storage position on a horizontal plane;
wherein the work apparatus defines a longitudinal plane which in said storage position runs perpendicular to said horizontal plane and contains said longitudinal axis;
said operator-control region defining a handle opening which penetrates fully through said housing in a direction transverse to the longitudinal plane;
said handle opening having, in a direction of the longitudinal axis, a distance point with a largest distance measured in the direction of the longitudinal axis to said back end of said housing;
said operator-control region extending in the direction of the longitudinal axis from said back end of said housing up to said distance point;
said housing having a frontal region extending in the direction of the longitudinal axis from said distance point up to said front end;
said housing defining an imaginary tangential plane which is only tangent to said housing;
said imaginary tangential plane running perpendicular to said longitudinal plane;
said imaginary tangential plane being tangent to said bale handle; and,
said imaginary tangential plane being tangent to said housing in said operator-control region of said housing.

2. The work apparatus of claim 1, wherein said imaginary tangential plane is tangent to said housing in said operator-control region of said housing at a touch point.

3. The work apparatus of claim 2 further comprising:
a further operator-controlled element disposed in said operator-control region;
said further operator-controlled element being configured to unlock said operator-controlled element or to hold a locking element in an unlocking position; and,
said touch point lying between said further operator-controlled element and said frontal region in relation to the direction of said longitudinal axis.

4. The work apparatus of claim 1, wherein said tangential plane has a first side and a second side; said first side faces said horizontal plane in said storage position; and, said frontal region of said housing is arranged exclusively on said first side of said imaginary tangential plane.

5. The work apparatus of claim 1, wherein said frontal region has a frontal region distance to said imaginary tangential plane; and, said frontal region distance is small and said work apparatus is configured such that said frontal region of said housing can contact said horizontal plane in an event of an impact of the work apparatus with said imaginary tangential plane on said horizontal plane.

6. The work apparatus of claim 5, wherein said frontal region distance is smaller than 100 of a distance of said touch point to said horizontal plane.

7. The work apparatus of claim 1, wherein said frontal region of said housing has an impact projection; said impact projection protrudes in a direction of said tangential plane; and, said frontal region has in a region of said impact projection a smallest distance to said tangential plane.

8. The work apparatus of claim 1, wherein a battery shaft is arranged in said frontal region of said housing so that said housing can enclose a battery.

9. The work apparatus of claim 8, wherein said frontal region of said housing has an impact projection; and, said impact projection is part of said battery shaft.

10. The work apparatus of claim 9, wherein said impact projection forms an outer wall of said battery shaft.

11. The work apparatus of claim 8, wherein said battery shaft is configured to receive the battery in an insert direction running parallel to said longitudinal plane.

12. The work apparatus of claim 8, wherein said battery shaft defines an insertion opening; and, said insertion opening in said storage position is arranged on the side of the work apparatus facing away from said horizontal plane.

13. The work apparatus of claim 1, wherein said operator-control region has a hand guard for bearing a hand when actuating said operator-controlled element; and, said imaginary tangential plane is tangent to said operator-control region on said hand guard.

14. The work apparatus of claim 13, wherein said hand guard is formed as a projection of said operator-control region.

15. The work apparatus of claim 14, wherein said hand guard is hump-shaped.

16. The work apparatus of claim 1, wherein the work apparatus is a motor chainsaw, hedge shears or an angle grinder.

17. A handheld, battery-operated work apparatus comprising:
- a housing having a front end;
- a work tool arranged on said front end of said housing;
- said housing having a back end to which an operator-control region of said housing is assigned;
- said housing extending along a longitudinal axis from said back end to said front end;
- an operator-controlled element for operation of an electric motor of the work apparatus being arranged in said operator-control region;
- the work apparatus being configured so that it can be stored in a storage position on a horizontal plane;
- the work apparatus defining a longitudinal plane which in said storage position runs perpendicular to said horizontal plane and contains said longitudinal axis;
- said housing having a battery shaft;
- a further operator-controlled element disposed in said operator-control region of said housing;
- said further operator-controlled element protruding out of an operator-controlled element opening in said operator-control region in said storage position in a direction away from said horizontal plane;
- a hand guard for bearing the hand when actuating said operator-controlled element formed by said housing in said operator-control region;
- said operator-controlled element opening, in said storage position in a side view perpendicular to said longitudinal plane, having a low point corresponding to a point of the operator-controlled element opening having a smallest distance (d2) to said horizontal plane;
- the work apparatus defining an imaginary touch plane running perpendicular to said longitudinal plane through said low point and tangent to the battery shaft; and,
- said hand guard protruding beyond said imaginary touch plane.

18. The work apparatus of claim 17, wherein said operator-controlled element opening in said storage position is arranged on a side of said operator-control region facing away from said horizontal plane.

19. The work apparatus of claim 17, wherein said battery shaft has an outer wall which is tangent to said imaginary touch plane.

20. The work apparatus of claim 17, wherein said hand guard is formed as a projection of said operator-control region of said housing.

21. The work apparatus of claim 20, wherein said hand guard is hump-shaped.

22. The work apparatus of claim 17, wherein said imaginary touch plane intersects said hand guard.

23. The work apparatus of claim 17, wherein said battery shaft is configured to have a battery inserted into said battery shaft in an insert direction; and, said insert direction runs parallel to said longitudinal plane.

24. The work apparatus of claim 23, wherein said battery shaft defines an insertion opening.

25. The work apparatus of claim 24, wherein said insertion opening, in said storage position, is arranged on a side of the work apparatus facing away from said horizontal plane.

26. The work apparatus of claim 17, wherein the work apparatus is a motor chainsaw, hedge shears or an angle grinder.

* * * * *

UNITED STATES PATENT AND TRADEMARK OFFICE
CERTIFICATE OF CORRECTION

| | | |
|---|---|---|
| PATENT NO. | : 12,017,337 B2 | Page 1 of 1 |
| APPLICATION NO. | : 18/062379 | |
| DATED | : June 25, 2024 | |
| INVENTOR(S) | : H. Diehl et al. | |

It is certified that error appears in the above-identified patent and that said Letters Patent is hereby corrected as shown below:

In the Specification

In Column 13:
Line 51: delete "ith" and insert -- with -- therefor.

In Column 16:
Line 33: delete "100" and insert -- 10% -- therefor.

Signed and Sealed this
Twenty-ninth Day of October, 2024

Katherine Kelly Vidal
*Director of the United States Patent and Trademark Office*